United States Patent [19]

Littleton

[11] Patent Number: 5,247,678
[45] Date of Patent: Sep. 21, 1993

[54] LOAD TIME LINKER FOR SOFTWARE USED WITH A MULTIPROCESSOR SYSTEM

[75] Inventor: James G. Littleton, Houston, Tex.

[73] Assignee: Texas Instruments Incorporated, Dallas, Tex.

[21] Appl. No.: 420,491

[22] Filed: Oct. 12, 1989

[51] Int. Cl.⁵ .......................... G06F 9/44; G06F 9/40; G06F 15/16
[52] U.S. Cl. .............................. 395/700; 364/DIG. 1; 364/280.4; 364/281.3; 364/281; 364/230.4; 364/231.6
[58] Field of Search ... 364/200 MS File, 900 MS File; 395/700

[56] References Cited

U.S. PATENT DOCUMENTS

| | | |
|---|---|---|
| 4,638,425 | 1/1987 | Hartung .......................... 364/200 |
| 4,882,674 | 11/1989 | Quint et al. ...................... 364/200 |
| 4,961,133 | 10/1990 | Talati et al. ...................... 364/200 |
| 5,014,222 | 5/1991 | Donahue .......................... 364/521 |

*Primary Examiner*—Gareth D. Shaw
*Assistant Examiner*—A. Katbab
*Attorney, Agent, or Firm*—Robert D. Marshall, Jr.; James C. Kesterson; Richard L. Donaldson

[57] ABSTRACT

A method used in a multiprocessor computer system for linking extended functions, which are to be called from an application program running on a host processor and executed by a subprocessor, to primitive functions to be executed by the subprocessor. The extended functions may be created independently of the primitive functions, collected in a special partially linked load module, stored, and dynamically linked to other code at run time of the application program.

11 Claims, 4 Drawing Sheets

LOAD TIME LINKER FOR SOFTWARE USED WITH A MULTIPROCESSOR SYSTEM

TECHNICAL FIELD OF THE INVENTION

This invention generally relates to computer processing, and more particularly to a method, used with a multiprocessor system, for linking, at run time, extended functions to be executed by a subsystem processor to other programming of the system.

BACKGROUND OF THE INVENTION

An important development in computer processing has been multiprocessor systems, which use more than one processor, each capable of independent action to execute applications programming. Different program tasks are assigned to separate processors, each processor optimized to perform its assigned task, with the result that execution time of the application is reduced. Some multiprocessor systems have processors that are dissimilar as well as separate, each having its own instruction set. Even the idea of separate processors is evolving; a developing innovation is fabricating dissimilar processors in an integrated circuit.

Multiprocessor systems vary with respect to the manner in which they use software as an interface between processors. When separate processors are to execute different programs, the interface is standard network communications protocols. In contrast, when separate processors are to execute different tasks of one integrated application, the interface is a matter of assigning functions.

In a system having a host processor and a subsystem processor, an important design choice is how many subprocessor functions will be fixed, i.e., not programmable by the user. One approach is to provide all functions required for applications programs already built in. Yet, because of the difficulty of predicting which functions the user will actually use, systems designed with this approach attempt to be all inclusive, and become large and slow, defeating the purpose of using a separate processor in the first place. Another approach is to provide only a limited number of built-in functions, i.e., primitives, and permit users to add additional subprocessor functions to the system. The characteristic of accommodating user developed functions that extend the primitive functions of the subsystem is referred to as the "extensibility" of the subsystem.

Yet, in many multiprocessor systems, although a user may program the subsystem processor, the extended functions are linked once, for example, to form a library, and are thereafter not capable of being changed. At run time, this statically linked library must be loaded into memory in entirety. Of course, this is a disadvantage to a user who does not desire to load the entire library or who desires to add new functions.

Thus, a need exists for a method of extending functions of a subprocessor system, which does not confine the user to a fixed set of functions. A user should be able to program extended functions that can be linked to other functions of the subprocessor system, as required by a particular application.

SUMMARY OF THE INVENTION

One aspect of the invention is a method of adding extended functions to be loaded to a subprocessor of a multiprocessor system. The programmer codes a set of extended functions and creates a reference section with an address reference for each function. The user then links the extended functions to the reference section to create a partially linked load module. This load module is capable of being downloaded to a subprocessor system and linked with other code at run time, as needed by a particular application program.

Another aspect of the invention is a method, used in a multiprocessor system, for loading extended functions to be executed by a subsystem processor. At run time, the extended functions are downloaded from the host system to the subsystem. These functions are then linked with any primitive functions of the subsystem.

A hardware aspect of the invention is a multiprocessor computer system that permits extended functions to be loaded from a first processor to a second processor and dynamically linked to other code. References that are unresolved at programming time can be resolved during the dynamic linking at run time.

Another aspect of the invention is a linker software mechanism for use in a multiprocessor system. The linker operates at load time and links a set of extended functions to a set of primitive functions, all to be invoked by an applications program running on a host processor and executed by a subsystem processor.

A technical advantage of the invention is that an application program may be written for a multiprocessor system to permit a host processor and subprocessor to execute functions defined by the programmer. An end user may separately acquire this applications program and a subprocessor system, both for use in a multiprocessor system, and, at run time, link the functions invoked by the application program to functions defined by the subprocessor system. Alternatively, a library of extended functions may be created as a viable product to be dynamically linked to other code at run time. Another advantage is that functions may be loaded or discarded according to application demand, thus reducing memory requirements for any particular application.

BRIEF DESCRIPTION OF THE DRAWINGS

The novel features believed characteristic of the invention are set forth in the appended claims. The invention itself, however, as well as modes of use and further advantages, is best understood by reference to the following description of illustrative embodiments when read in conjunction with the accompanying drawings.

DETAILED DESCRIPTION OF THE INVENTION

For purposes of this description, subprograms such as those a user might desire to add to a multiprocessor system are referred to as "extended functions", or where the meaning is clear from this context, simply as "functions". The system running the main program is referred to as the "host processor system" or "host system". The system on which the extended functions are to be executed is the "subprocessor system" or "subsystem".

The invention is contemplated for eventual use in connection with an applications program running in the host system. The general software environment in which the invention operates may be any language in which a compiler produces an intermediate form of the program called an object file. Furthermore, the language is modular: the source code is divided into files that are compiled separately. A linkage editor reads the intermediate files and links them together into an executable file. Examples of a compiler and a linker, such as might be used in a multiprocessor system, although not directed to extended functions, are discussed in the "TMS34010 Assembly Language Tools User's Guide" and "TMS34010 C Compiler Reference Guide", both published by and available from Texas Instruments, Inc.

"Core primitives" are basic functions that are permanently installed in a subprocessor system and are always available for loading. These core primitives may be grouped into two basic functional types: systems primitives and application primitives. The systems primitives include functions for performing such operations as subsystem initialization, output, memory management, communications, and extensibility. The latter type of systems primitives, the extensibility functions, are used in connection with the method of the invention and will be discussed in further detail below. Application primitives are available to be called from the application program running on the host, if they have been linked using the invention.

The "user" of the invention may be various persons who create or use extended functions for a multiprocessor system. For example, the user may be a programmer who supplies extended functions for use by other programmers or, the user may be a programmer who desires to add extended functions to a program being developed for use with the system or to a subsystem that will be later installed in a multiprocessor system. The user may be someone actually running a program having extended functions. Furthermore, the invention may be made or sold by any one of these users. The various aspects of the invention discussed below are directed to different users and different physical embodiments of the invention. Finally, as is characteristic of computer methods and programs, the user may be other programming.

The following description of the invention is primarily directed to the C programming language. However, the programming for implementing the invention is not unique to C, and the programming structure and functionality described herein can be readily translated into any high level language. The actual language and programs required to implement the invention may depend on the particular system in which the present invention is implemented. The specific programs are considered to be within the ability of a programmer having ordinary skill in the art after having reviewed the present specification. Although the present invention has been described in the context of a C language embodiment, it will be readily apparent to those skilled in the programming art that modifications and variations can be made therein without departing from the scope of the present invention as defined in the following claims.

A premise of the invention is that a subprocessor system is best used if it has extended functions that may be loaded, linked and used independently of its core primitives. In accordance with this premise, the invention provides a method for integrating extended functions with other programming of a multiprocessor system. The method is implemented with a software mechanism that dynamically links the various functions used with an application program, regardless of when and where the functions were coded.

Figure 1:
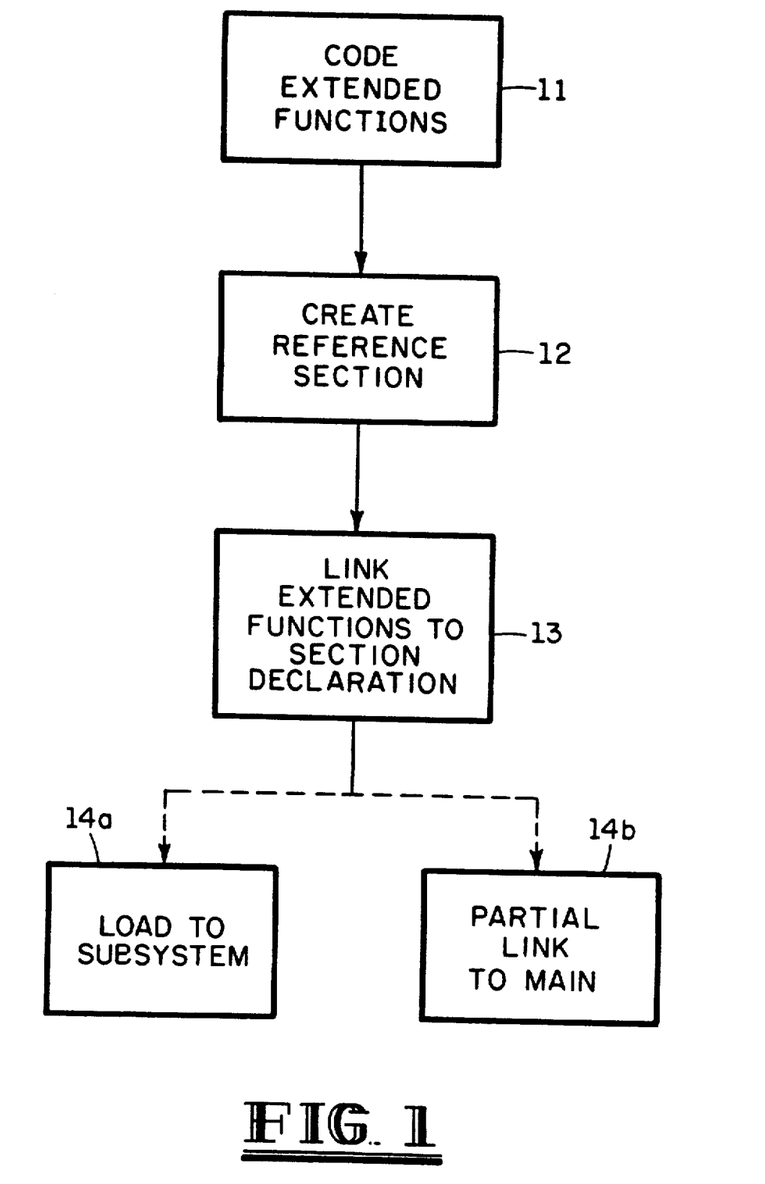
FIG. 1 illustrates the steps of creating a module containing extended functions, for use with a subprocessor system.

FIG. 1 illustrates the method of the invention, from the viewpoint of a programmer who desires to develop extended functions for a subsystem processor. These extended functions consist of functions that will eventually be called in an application program to perform certain tasks for the user. Basically, the steps are creating a set of extended functions and a section of address references to each function. Linking the extended functions to the section references creates a load module which can be partially linked to existing code, leaving references to other code to be resolved at run time.

With respect to linking and loading steps of the invention, the following description refers to operations and structures that are common to software programming that performs these tasks. In particular, the linker is assumed to create object files in a common object file format (COFF), which is a format well known in the art. This format encourages modular programming, each module having smaller blocks of code and data, which are referred to as sections. A section is the smallest relocatable unit of an object file, and will eventually occupy contiguous space in the memory where it is loaded. The COFF format permits the extended functions to be written in one of numerous high level languages or in assembly language. It should be understood, however, that COFF is just one type of object format sufficient to create relocatable, partially linked, function modules.

Step 11 is creating a module of program code containing extended functions. Typically, this set of functions will be whatever functions are needed to perform designated tasks of a particular application program. Step 11 involves coding the extended functions, which may be accomplished in any manner that will permit extended functions to be called from the applications program running on the host and executed by the subprocessor. A number of such methods could be used, with the primary requirement being that the function definition permits the function's actual parameters be passed from the host to the subprocessor and permits any return values be returned to the host. Examples of such methods are a packet method or a direct access method.

After the functions are defined, they are collected, compiled or assembled, and linked into some form of loadable code, such as a series of common object files. An example of the result of step 11 is a file called myfuncs.obj, which contains two functions, my_func1 and my_func2.

An advantage of the invention is that modules of extended functions may be created by the same programmer who creates the applications program that will use them. Thus, the module to be loaded for use during the run of a particular application need only contain those functions required by the application. Furthermore, the manner of calling the function and its parameterization are the programmer's choice, subject to any special techniques required for interprocessor parameter passing.

Step 12 is creating a reference section, which declares an address reference for each extended function in the module created in step 11. An example of step 12 is the following programming, which references the two functions my_func1 and my_func2:

```
;External References
    .globl - my_func1, -my_func2
;Start section declaration
    .sect    ".EXT"
    .long    _my_func1  ;command number 0 within
                        module
    .long    _my_func2  ;command number 0 within
                        module
    .text              ;end section
```

The command numbers declare the functions in the load module to be defined in a particular order. This provides a means for referencing the function. Specifically, a function's command number can be incorporated into a function call in an applications program that calls the function. The reference section is compiled or assembled to generate a common object format file, for example ext.obj.

Step 13 is partially linking the module created in step 11 with the section created in step 12 to form a load module. This linking step resolves references among functions within the module, but it is to be understood that the module may contain functions which reference, or are referenced by, functions external to the module. If there are external references, the linking is only partial and the reference is unresolved. The partially linked file must have relocation information and symbolic information. The partial linking is concerned with the formation of output sections and not with allocation. All allocation, binding, and memory directives are performed during a subsequent link at run time.

An example of partial linking is when the module has a function that calls a core primitive. The unresolved reference is external to the module, being already stored in the subprocessor system, and the referencing function has no address for it. The essential feature of the linker used in Step 13 is that it allows functions to have calls that cannot be resolved until run time. As explained below in connection with FIGS. 2-4, when the functions are loaded into memory of the subprocessor system are these calls resolved. A dynamic linker resolves the calls by inserting addresses into the code.

The following is an example of a command to perform step 13, using a computer having a linker, where the two functions defined in step 11 and the section created in step 12 are to be linked. As an example, a linker is called with the following command:

link LOAD.MOD myfuncs.obj ext.obj

The result is a relocatable load module entitled LOAD.-MOD, which is a combination of the object modules created in steps 11 and 12.

The load module may then be used in a number of different ways, which is one of the advantages of the invention. For example, the module may be supplied to others who will link the module to a main program or load the module to a subsystem to be linked with core primitives. Alternatively, the same user may use the load module to develop an application program for a multiprocessor system. Thus, as shown in FIG. 1, the next step may be step 14a, loading the module to the subsystem, or step 14b, linking the module to an application program. From an end user's point of view, the load module may reside in memory of the user's host system, in a partially linked state, until downloaded to the subprocessor system for use with a particular application program, as explained below in connection with FIG. 2. The load module is then dynamically linked with an application program and with any other functions of the subprocessor system, as required to resolve unresolved references.

Figure 2:
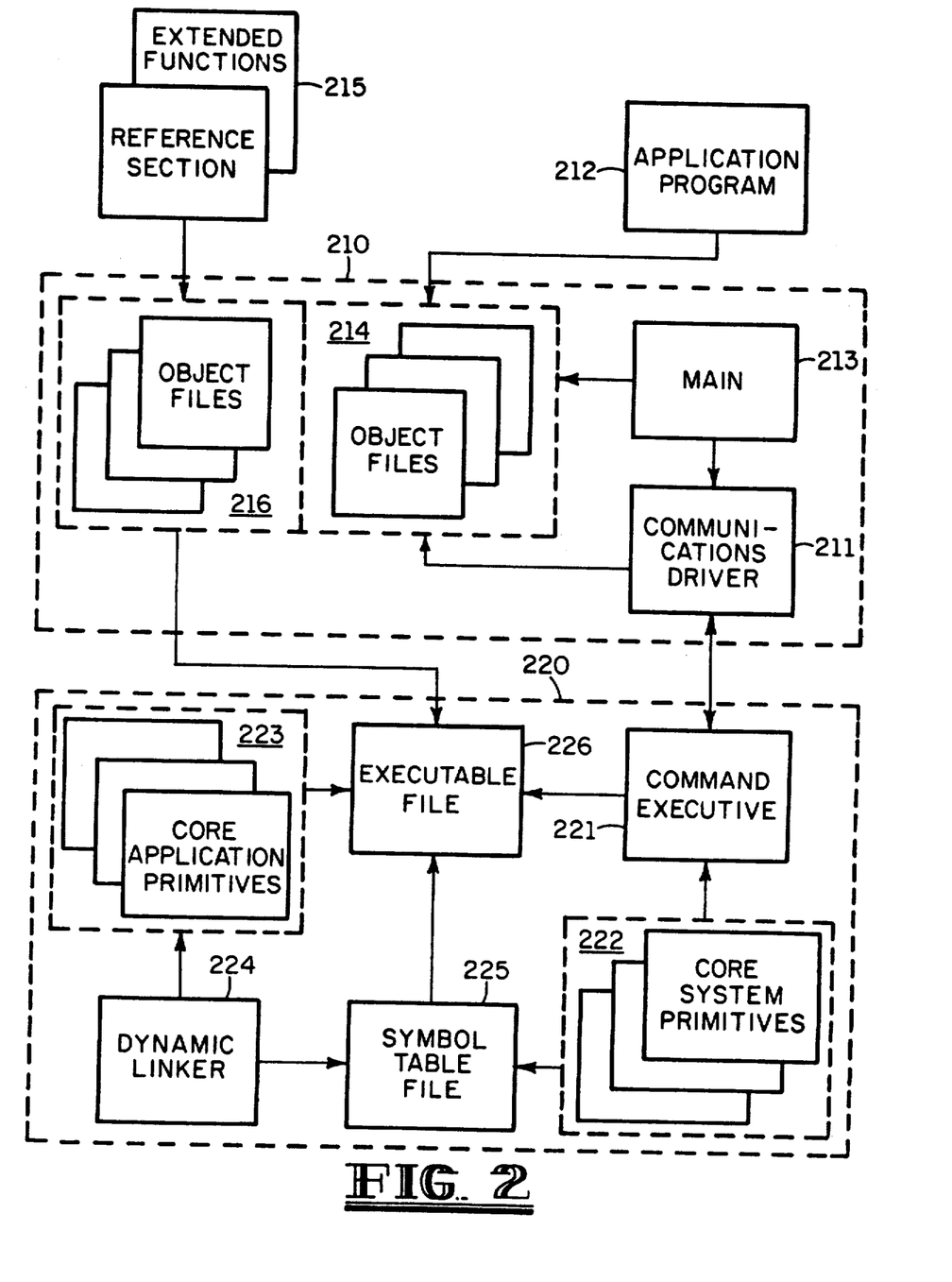
FIG. 2 illustrates the various software components involved in the method of linking extended functions to a subprocessor system during loading of an application program.
Figure 3:
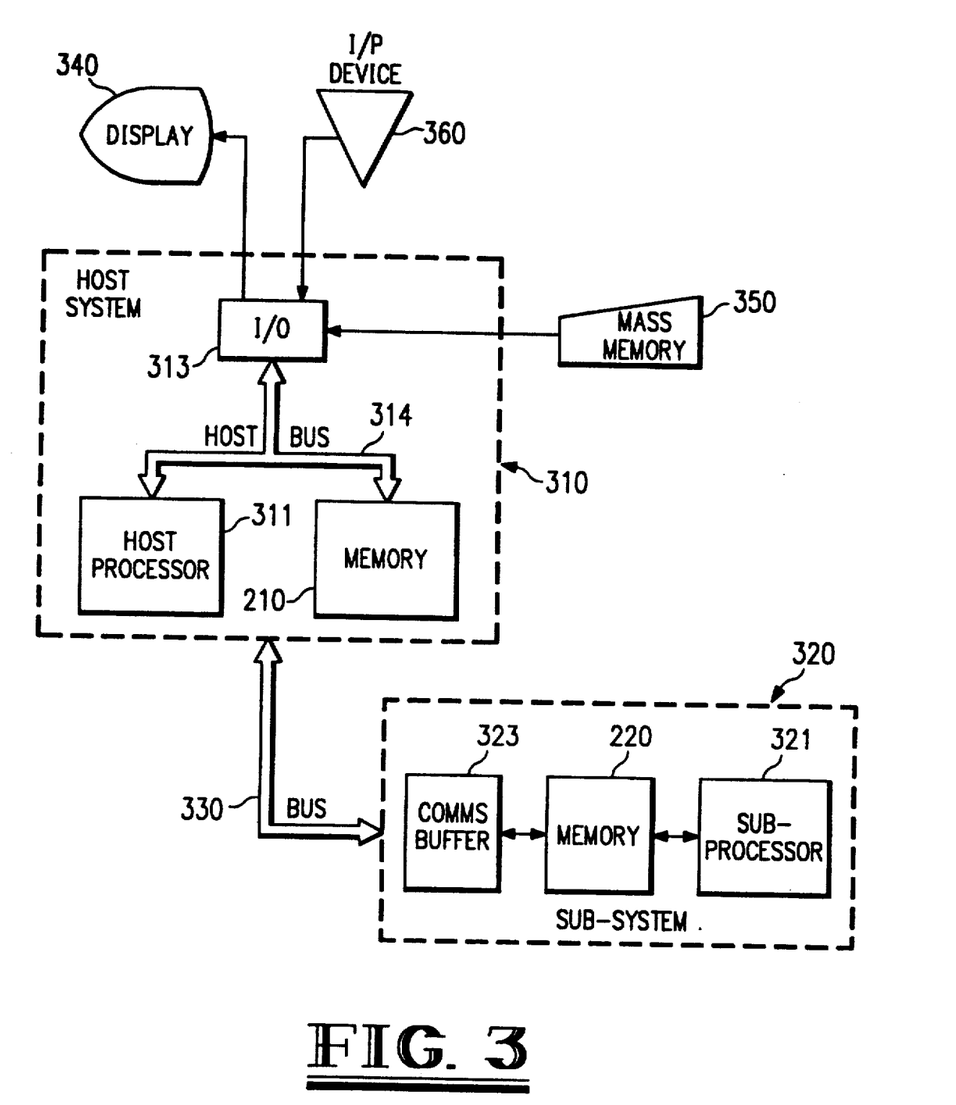
FIG. 3 illustrates a typical multiprocessor system with which the invention is used.
Figure 4:
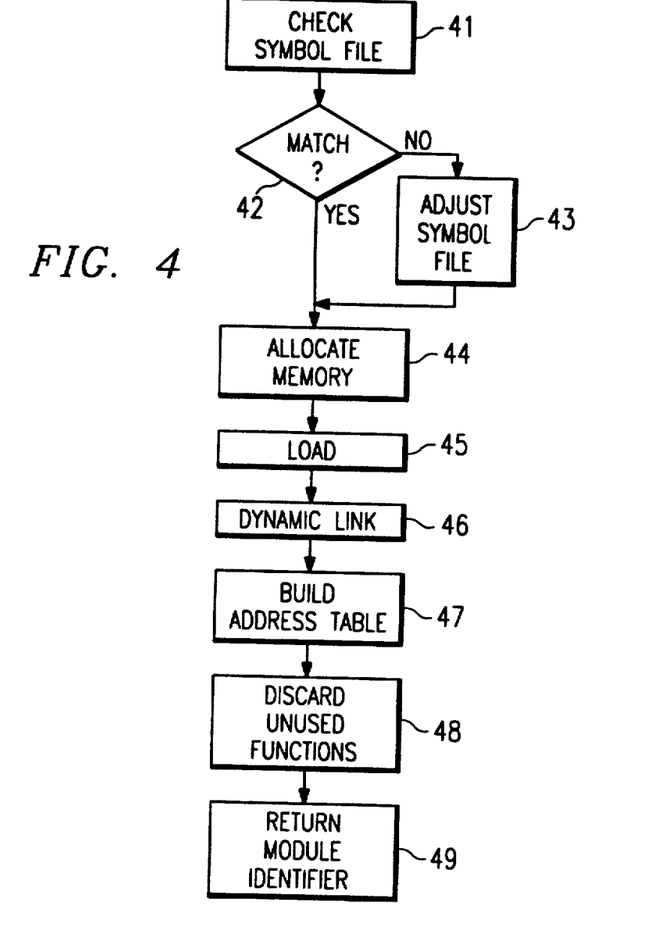
FIG. 4 illustrates the steps of loading an extended function from a first processor to a second processor and dynamically linking unresolved references.

FIGS. 2-4 illustrate a second aspect of the invention, a method of using a computer to load and dynamically link extended functions in a multiprocessor system. The linking is dynamic in the sense that at the time the extended functions are created, the addresses of other functions that the extended functions call are unknown. These addresses remain unknown until the application program is running.

FIG. 2 illustrates a second aspect of the invention, a method of using a graphics subsystem in a host computer system. FIG. 2 is in the form of a system flow diagram, with the steps of the method being associated with software programs that perform them. In general, FIG. 2 comprises software residing in both host memory 210 and graphics memory 220. The software residing in memory 210 is a communications driver 211, application program object files 214, and extended function object files 216, the latter to be loaded to graphics memory 220 as discussed below. The components labeled 212 and 215 indicate that the application files 214 and the extended function load module files 216 have been compiled from source code modules. One of the application files 214 is a main program 213. The software residing in memory 220 is a command executive 221, an executable file 226 of extended function definitions, include files 225, and core primitives 222, 223, and 224. These components are further described in connection with FIG. 4.

The method of FIG. 2 is for use on a multiprocessor computer system having a communication means between processors, and is therefore, best understood with reference to FIG. 3, which is a block diagram of a such a system. The system has both a host processor system 310 and a graphics processor subsystem 320. In the preferred embodiment, the graphics system 320 is configured so that graphics processor 321 can run in parallel with host processor 311, calculating and manipulating graphics information, while host processor 311 continues with other processing tasks.

Typically, host processor 311 is optimized for peripheral management, such as the Intel 80286 and 80386 processors. These processors are used with DOS-BASED personal computer systems, but the invention is not limited to DOS operating systems. In fact, the methods and mechanisms described herein may be implemented using a variety of processors and operating systems. Memory 210 associated with host processor 311 includes random access memory (RAM), which permits it to access programs that direct its operations.

Graphics processor 321 is designed for graphics processing and is programmable. An example of such a processor is the 34010 graphics processor, manufactured by Texas Instruments, Inc., which is a 32 bit microprocessor with instruction set extensions for graphics processing as well as hardware for display device control and refresh tasks. Memory 220 includes RAM memory so that graphics processor 321 can store programs that instruct it how to process graphics information.

A communication means between the two processors is embodied by bus 330 and communications buffer 323. Bus 330 is bidirectional and provides a data path and control lines. Communications buffer 323 can be accessed by both processor system 310 and 320, and is explained in detail in connection with FIG. 5. Other hardware implementations of a communications means are possible with the primary requirement being that each processor 311 and 321 have access to parameter space for handshaking between processors, function identification space to identify the function being called, and data space to pass command arguments and additional data. The configuration shown in FIG. 3 is only one of numerous means for providing interprocessor communications, and other means are easily developed. Furthermore, although FIG. 3 shows the two processor systems, 310 and 320, as having separate memories 210 and 220, the communications means may be a shared memory.

The multiprocessor system of FIG. 3 operates with various standard peripheral devices, notably a display 340, mass storage 350, and input devices 360, such as a keyboard or mouse. An I/0 circuit 313 is used to communicate information in appropriate form between these input and output devices and the other parts of host system 310, via a host system bus 314. Display 340 and input devices 360 permit a user to interact with the host processor system 310. If subprocessor system 320 is used for graphics tasks, display 340 may be coupled to processor 321 rather than to host system 310.

Referring again to FIG. 2, in the preferred embodiment, the dynamic linking is performed at load time, before a first run of the program. It is thus referred to as a run time operation. Two active memories 210 and 220 are associated with the host processor and subprocessor systems respectively. It is assumed that the system includes a communications driver 211 loaded to the host system, having communications routines available for use at load and run time.

It is also assumed that a command executive 221 is loaded to memory 220 of the subprocessor system. One purpose of command executive 221 is to decode command numbers for execution by the subprocessor. Typically, a number of core system primitives 222 reside in memory 220. In one embodiment of the invention, some of these core primitives help perform extensibility tasks, as explained below.

To use the method of FIG. 2, the user runs an application program 212, which is loaded into host system memory 210 to form an executable image, i.e., Main 213 and associated object files 214. Although Main 213 is run on the host system, it calls extended functions to be executed on the subprocessor system. Thus, Main 213 requires the use of a load module 215, which contains definitions of extended functions and a reference section, loaded to memory 210 as load module object files 216. In the preferred embodiment, load module 215 is created in accordance with the method illustrated in FIG. 1.

In response to a request for load module 215 in applications program 212, Main 213 invokes other programming in the form of a dynamic linker 224. Thus, the entry point of dynamic linker 224 is in response to loading application program 212.

Dynamic linker 224 performs a number of operations, some in association with core system primitives 222. This auxiliary use of core system primitives is the preferred embodiment, which is designed for reusability of systems programming. In a less modular embodiment of the invention, all tasks could be performed by a single program dedicated to dynamic linking that does not rely on core primitives.

The steps of the dynamic downloading method of the invention are shown in FIG. 4. Generally, the method comprises the steps of loading a set of extended functions from host processor system 310 to subprocessor system 320, and linking any unresolved references of the extended functions at this time.

First, in steps 41-43, dynamic linker 224 checks for the existence of two files it needs: symbol table file 225 and load module 215, now stored in memory 210 as partially linked object files 216. Symbol table file 225 is maintained by, a symbol table function in core primitives 222, and contains symbolic information representing functions already loaded to memory 220 of the subprocessor system 320 and associated memory addresses for each function. Thus, if previously created load modules are to be used, they must be loaded and their symbols and addresses placed in symbol table file 225. Thus, prior to performing the method of the invention, symbol table file 225 represents functions that are external to load module 215, i.e., they are not defined in load module 215. An example of a symbol table function to implement this task the following C language function:

int create-symbol_file (name) char far *name;

where name is a pathname of a file containing the functions. The symbols and their respective absolute addresses are stored in such a manner that they can be accessed during subsequent invocations of the loader.

To ensure the integrity of symbol table file 225, dynamic linker 224 performs a restricted call to command executive 221, which uses a special core system primitive to inquire about the state of any previously installed modules in the subprocessor system memory 220. The purpose of this step is to determine whether there is any discrepancy between such modules and the module symbols in symbol table file 225. If so, symbol table file 225 is adjusted accordingly. If not, an error message is communicated to the user.

In step 44, dynamic linker 224 obtains the memory size required for the desired load module object files 216. It calls a special allocation function from core system primitives 222 to obtain a block of memory large enough to contain the load module. An example of a command representing such an allocation function is:

| long alloc (size) |
| --- |
| long size; | where long size is the size in bytes of the module. This function allocates a block of the subprocessor system memory 220 of a specified size and returns a pointer.

In steps 45-46, dynamic linker 224 performs its primary tasks of combining object files to be executed by the subprocessor system 320 into an executable image file 226. As dynamic linker 224 creates the executable file 226, it loads object files 216 to memory 220 and resolves external references. In doing so, it accepts load files 216 as input, as well as application primitive files 223. More specifically, dynamic linker 224 relocates the desired COFF sections into the subsystem's memory map. To resolve previously unresolved references to external functions, i.e., functions not defined in load module 215, dynamic linker 224 references symbol table file 225 to find a symbol representing that function.

Dynamic linker 224 then replaces the reference in load module 216 with the referenced function's address. In this manner, dynamic linker 224 links all extended functions listed in the reference section of load module 216 to other code loaded in subprocessor system 320. Similarly, dynamic linker 224 adds symbols representing functions defined in load module 216 to symbol table file 225 so that subsequently installed load modules can access load module 216.

In general, the programming methodology for performing the linking of step 46 uses programming techniques similar to that of other dynamic linking tools, used with single processor systems. Of course, those systems do not require the additional tasks of relating two processor systems, as is accomplished by the present invention.

After load module 216 has been loaded into memory 220 in step 47, dynamic linker 224 uses the information in the load module's reference section to enable functions in the module to be called from application program 212. Specifically, dynamic linker 224 builds a table (not shown) representing extended function addresses for use by command executive 221.

In step 48, dynamic linker 224 determines whether there are any functions presently loaded to memory 220 that are not needed by an application program. If so, these functions are discarded from active memory.

Finally, in step 49, dynamic linker 224 returns a module identifier to the application program. The module identifier is used in calls to the extended functions from application program 212 to invoke those functions. By way of example, the module identifier may be the same as the module number in the reference section discussed in connection with FIG. 1. Step 48 is useful when more than one module is to be loaded on subprocessor system 320.

In the preferred embodiment, the dynamic linking illustrated in FIG. 2 is part of an installation process, during which the user uses the computer to invoke an install procedure, that, in turn, invokes dynamic linker 224. An example of an install instruction is the following function written in the C language:

int install—lm (lm—name) char far *lm—name;

where lm—name is the load module name. Following the steps described above, this function installs whatever load module is specified by the load module name and returns a module identifier.

Once load module 216 is downloaded and linked, the run time operations of the multiprocessor system involve the use of some sort of parameter passing technique between the two processor systems. As discussed above in connection with FIG. 1, this can be accomplished at the programming stage with special function definitions and calls, designed to permit argument data and return data to be transferred between processor systems and understood by both processors 311 and 321.

As indicated above, more than one load module 216 may be loaded, which each receiving its own module identification number. The dynamic linker 224 can be programmed to return an identifier that identifies both the module and the extended functions within the module. An example of one way to implement the identification is to assign each load module 215 a module number according to.. the order in which it is installed. This identifier is used whenever a function in the module is to be called from a program, by joining the module identifier with a function number, such as was assigned in step 12 of FIG. 1. In the C language, this can be implemented by using the bitwise OR operator. The linking will then include all load modules.

In an alternative embodiment of the invention, rather than extended functions, interrupt service routines to be used by an applications program are added to a multiprocessor system. The method illustrated in FIG. 1 is essentially the same except that the load module contains interrupt service routines. The latter are called on reception of an interrupt via an interrupt handler of the subsystem. Step 12 involves the creation of a reference section containing two entries for every interrupt service routine within the module. These entries specify an address reference to the interrupt service routine and the interrupt number of the routine. For example, if two routines, my—int1 and my—int2, were contained in the module of step 11, the section declaration would be:

```
;External References
    .globl  _my_inti, _my_int2
;Start section declaration
    .sect   ".ISR";
    .long   _my_int1
    .long   1;              ;interrupt number 1
    .long   _my_int2
    .long   2               ;interrupt number 2
    .text                   ;end section
```

The load time method associated with adding interrupt service routines is also essentially the same as described above in connection with FIG. 2. One additional consideration is that priority information associated with each routine can be retrieved by accessing a priority list for the module. Thus, interrupt service routines chained in the same interrupt level can be specifically accessed or referred to.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description. It is, therefore, contemplated that the appended claims will cover such modifications that fall within the true scope of the invention.

What is claimed is:

1. A method for extending an applications program for use with a multiprocessor computer system having a host processor in data communication with a subprocessor, wherein extended functions are to be loaded to memory of the subprocessor but called by the host processor from the applications programming for execution by the subprocessor, comprising the steps of:

storing in the host processor a program module containing definitions of extended functions, which are functions to be executed by a subprocessor, wherein some of said extended functions call other functions already stored in memory of said subprocessor and other of said extended functions call other functions of said program module, and wherein each of said functions has a function call and a function identifier;

creating in the host processor a reference section containing a list of said function identifiers and a relocatable address reference for each of said function identifiers, wherein the order of said function identifiers in said reference section corresponds to the order of said functions in said program module;

compiling in the host processor said program module and said section into object code to create a function definition object file and a reference section object file;

differentiating in the host processor between external references to said extended functions, which are calls from other functions not stored in said program module, and internal references to said functions, which are calls from other functions of said module; and partially linking in the host processor said function definition object file and said reference section object file, while said object files are stored in memory of said host processor, such that said internal references are resolved by matching each function identifier of an internally called function to its address reference in said reference section, leaving said external references unresolved; and creating in the host processor a downloadable file containing the partially linked function definition object file and said reference section object file.

2. A method for extending an applications program for use with a multiprocessor computer system having a host processor in data communication with a subprocessor, wherein interrupt service routines are to be loaded to memory of the subprocessor but called by the host processor from the applications programming for execution by the subprocessor, comprising the steps of:

storing in the host processor a program module containing definitions of extended interrupt service routines and functions, which are routines and functions to be executed by a subprocessor, wherein said routines are initiated by said host processor and at least some of said functions are called by said routines, and wherein each of said routines and functions has an identifier;

creating in the host processor a reference section containing a list of said identifiers and a relocatable address reference for each of said identifiers, wherein the order of said identifiers in said reference section corresponds to the order of said functions and routines in said program module;

compiling in the host processor said program module and said section into object code to create a function and routine definition object file and a reference section object file;

differentiating in the host processor between external references to said functions, which are calls from other functions not stored in said program module, and internal references to said functions, which are calls from other functions or routines of said program module;

partially linking in the host processor said function definition object file and said reference section object file, such that said internal references are resolved by matching each function identifier of an internally called function to its address reference in said reference section, leaving said external reference unresolved; and creating in the host processor a downloadable file containing the partially linked function definition object file and said reference section object file.

3. A method, used in a multiprocessor system having a host processor and a subprocessor with separately accessible memories, for loading and linking to memory of the subprocessor, extended functions to be executed by the subprocessor, such that the functions can be called from an application program being executed by the host processor system comprising the steps of:

storing in the host processor a program module containing definitions of extended functions to be executed by a subprocessor, wherein all calls by said extended functions to other of said extended functions within said load module have been resolved by providing a memory address of the called function;

determining in the subprocessor the memory size required to store said program module in memory accessible by the subprocessor;

allocating in the subprocessor memory in the subprocessor system for said program module;

downloading said program module from the host processor to the subprocessor system; and linking in the subprocessor calls by said extended functions to other functions already stored in memory of the subprocessor.

4. The method of claim 3, and further comprising the step of communicating data representing an identifier of the download program module from the subprocessor to said application program in the host processor so that said functions in said load module may be called by said application program.

5. The method of claim 3, wherein said linking step occurs in response to loading said application program to memory of the host processor.

6. The method of claim 3, and further comprising the step of generating in the subprocessor a table of memory addresses of functions already stored in memory of the subprocessor, and wherein said linking step is accomplished by accessing said table and of matching said addresses to calls to the associated function from functions stored in said load module.

7. The method of claim 6, and further comprising the step of storing in the subprocessor functions of said program module in memory of said subprocessor and the step of adding identifiers and addresses of said functions to said table.

8. The method of claim 3, wherein more than one program module is loaded and linked, and further comprising the step of assigning via the subprocessor a module identifier to each of said modules.

9. The method of claim 3, wherein said program module contains interrupt service routines, and further comprising the step of linking in the subprocessor calls by said routines to functions already stored in memory of the subprocessor.

10. The method of claim 1, further comprising the steps of:

downloading said program module from the host processor to the subprocessor; and linking in the subprocessor calls by said extended functions to other functions already stored in the subprocessor.

11. The method of claim 2, further comprising the steps of:

downloading said program module from the host processor to the subprocessor; and linking in the subprocessor calls by said extended functions to other functions already stored in the subprocessor.

* * * * *